July 17, 1962 T. T. WOODSON ET AL 3,044,715
WASTE DISPOSAL DEVICE WITH SOUND INSULATION
Filed April 6, 1959 2 Sheets-Sheet 1
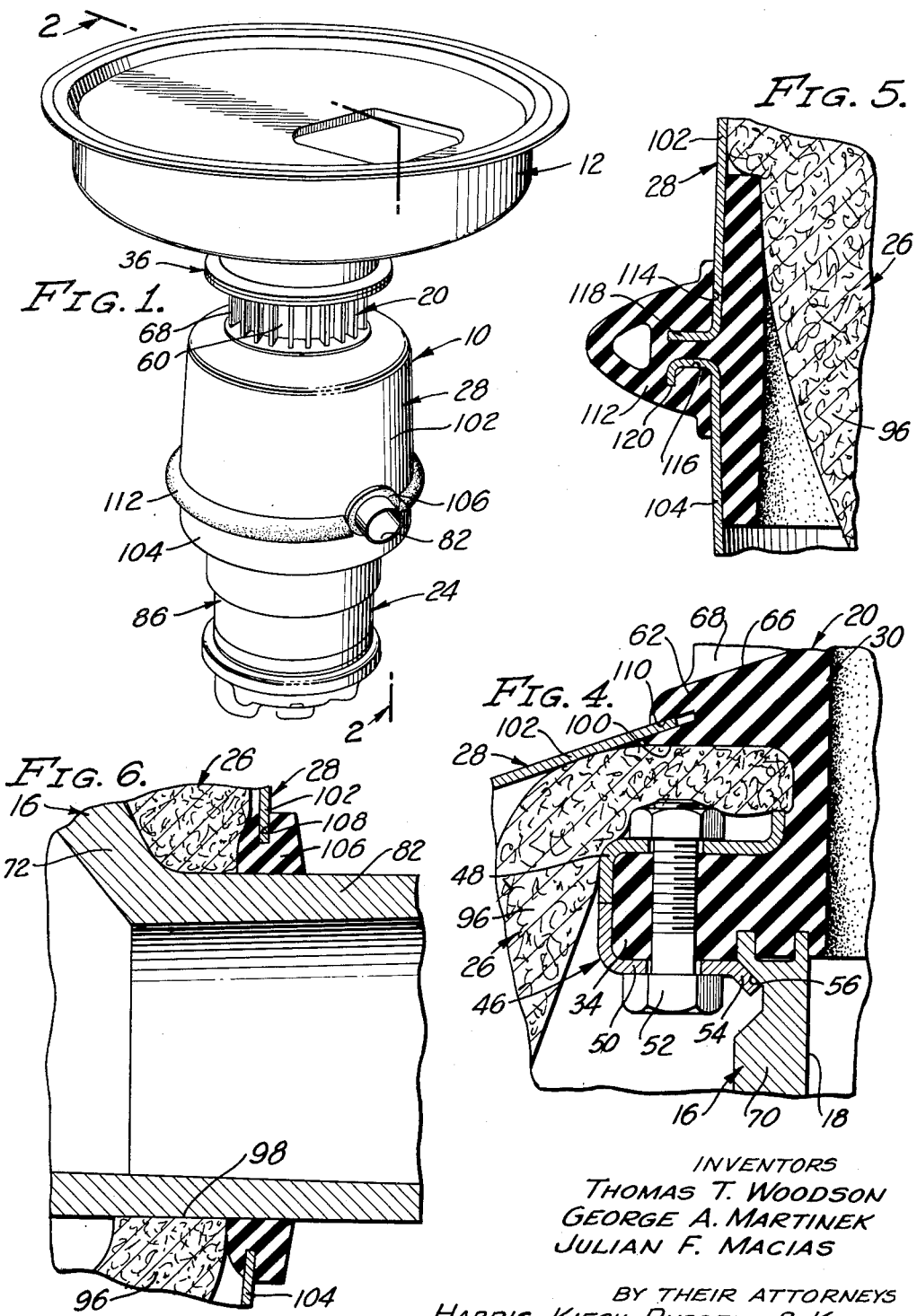
INVENTORS
THOMAS T. WOODSON
GEORGE A. MARTINEK
JULIAN F. MACIAS
BY THEIR ATTORNEYS
HARRIS, KIECH, RUSSELL & KERN

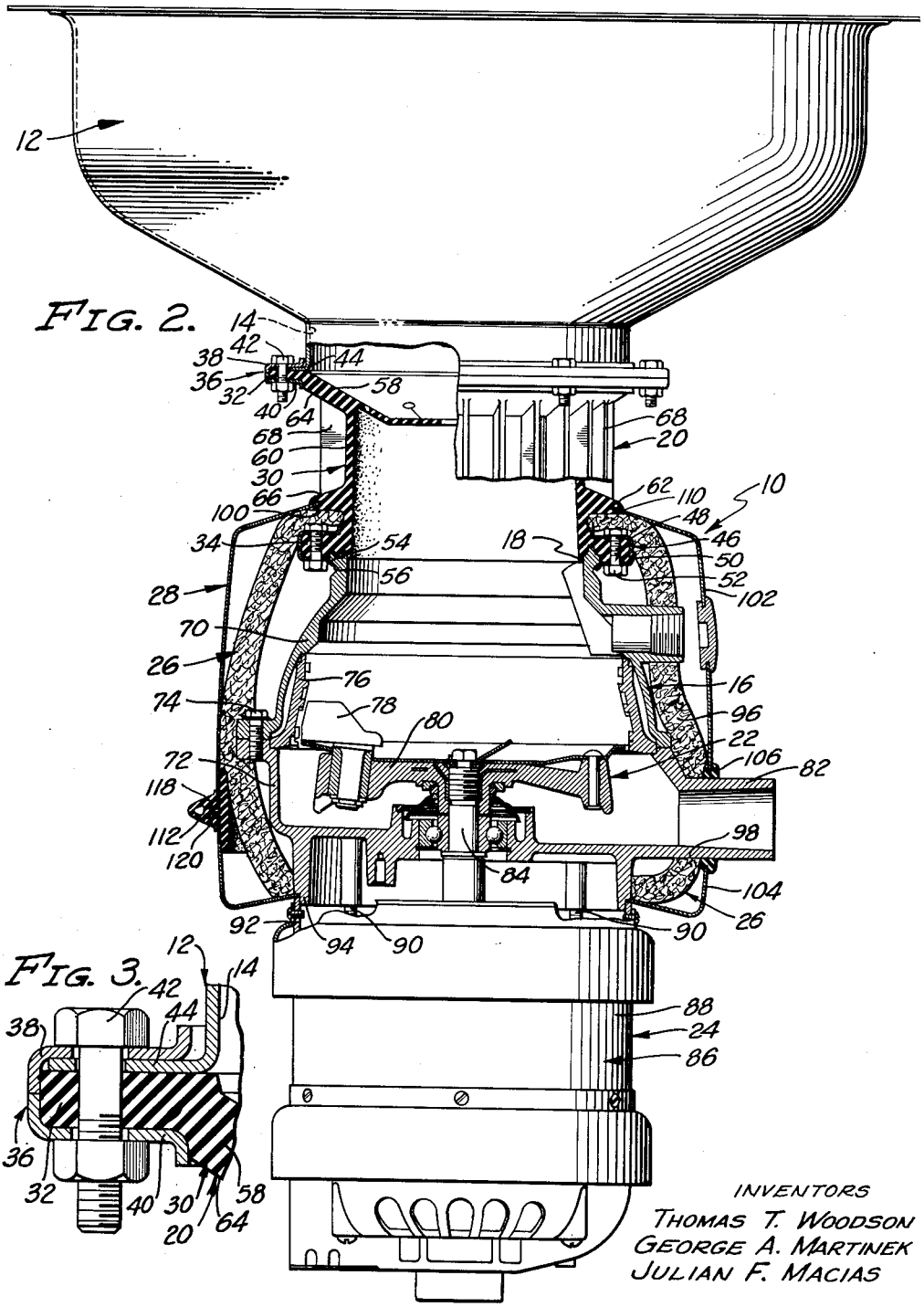

United States Patent Office 3,044,715
Patented July 17, 1962

3,044,715
WASTE DISPOSAL DEVICE WITH SOUND
INSULATION
Thomas T. Woodson, La Canada, George A. Martinek, Pasadena, and Julian F. Macias, La Mirada, Calif., assignors to Waste King Corporation, Los Angeles, Calif., a corporation of California
Filed Apr. 6, 1959, Ser. No. 804,257
2 Claims. (Cl. 241—100.5)

The present invention relates in general to appliances or devices for comminuting kitchen waste or garbage in homes, restaurants and the like, and more particularly, to devices of this type having vibration absorbing or damping means for reducing transmission of sound and other vibrations normally produced by such devices.

Conventionally, a kitchen waste disposal appliance is suspended from a kitchen sink below a drain opening through which waste is flushed into the appliance to be comminuted by a rotatable comminuting or grinding means therein, the latter being driven at a relatively high speed by an electric motor located therebelow. The rotatable comminuting means is subjected to random loading, which frequently results in unbalanced operation, and is required to handle relatively hard waste, such as animal bones, fruit pits and the like. The result of all of this is that the comminuting means frequently generates sound and other vibrations which are objectionable.

The vibrations generated by waste disposal devices are transmitted primarily in two ways. First, sound vibrations are transmitted generally radially outwardly from the housing of the device to the surrounding atmosphere. Secondly, vibrations are transmitted vertically from the device through its mounting means to the sink from which it is suspended, the sink transmitting the vibrations to the structure on which it is mounted, which may be a dish table in a restaurant installation, or a drain board in a household installation. In either event, the sink supporting structure acts as a sounding board to amplify the vibrations from the disposed device and to transmit them to the atmosphere as objectionable noise.

A general object of the invention is to minimize vibration transmission from the device along both the paths mentioned, the invention providing elastomeric suspension means for the device to minimize vibration transmission to the sink, and providing vibration absorbing material around the device to minimize generally radial vibration transmission directly to the atmosphere.

The elastomeric suspension means for the device comprises a vertically oriented elastomeric sleeve having an upper end connected to the sink around the drain opening therein and having a lower end connected to an open upper end of a housing which contains the rotatable comminuting means, the waste to be comminuted being delivered to the comminuting means by flushing it downwardly from the sink through the elastomeric suspension sleeve and the upper portion of the housing, which serves as a hopper means for the comminuting means.

One specific object of the invention is to provide the elastomeric suspension sleeve with external, vertical reinforcing ribs which carry part of the weight of the waste disposal device and which serve to stabilize it against any tendency toward lateral movement induced by unbalanced loading of the comminuting means. A related object is to provide the elastomeric suspension sleeve with downwardly converging upper and downwardly diverging lower external walls which are integrally joined by the reinforcing ribs to provide a sturdy suspension sleeve.

By reinforcing the elastomeric suspension sleeve in the foregoing manner, the sleeve may have substantial length in the vertical direction to absorb substantially all of the vibrations which tend to be transmtited to the sink and, at the same time, lateral stability is provided.

Another object of the invention is to provide an elastomeric suspension sleeve having adjacent its upper and lower ends upper and lower, outwardly extending, peripheral flanges, and to provide simple and effective upper and lower connecting means for respectively connecting the upper flange to the sink around the drain opening therein and the lower flange to the housing of the waste disposal device around the open upper end thereof.

More particularly, an object of the invention is to provide an upper connecting means comprising a horizontally split, upper ring of channel-shaped cross section which receives the upper flange therein and which receives an outwardly extending peripheral flange of the sink around the drain opening therein, the upper connecting means also including means for clamping the two parts of the horizontally split upper ring together.

Similarly, an object is to provide a lower connecting means which includes a horizontally split, lower ring of channel-shaped cross section adapted to receive the lower flange of the elastomeric suspension sleeve therein and on which the upper end of the housing of the waste disposal appliance is adapted to seat, the lower connecting means also including means for clamping the two parts of the horizontally split lower ring together.

In connection with the means for minimizing generally radial vibration transmission to the atmosphere from the waste disposal device, an object of the invention is to provide vibration absorbing material around the housing and to provide a vertically oriented, horizontally split shell which encloses the vibration absorbing material, at least one part of the enclosing shell being elastomerically connected to the housing to minimize vibration transmission thereto. The vibration absorbing material, which may be a discrete blanket, a mastic coating, or the like, absorbs sound by multiple reflection in the annular space between the housing and the shell.

More particularly, an object is to provide a shell having an upper part elastomerically connected to the housing, a lower part connected to the housing, and elastomeric means interconnecting the two parts in spaced relation.

Still another object is to provide the elastomeric suspension sleeve with an external annular groove which receives the upper end of the upper part of the shell.

A further object is to provide an elastomeric ring which encircles the housing and the vibration absorbing material and which is provided with annular grooves respectively receiving the lower end of the upper part of the shell and the upper end of the lower part thereof.

Another object is to provide vibration absorbing material in the form of a vertically oriented annular blanket the upper end of which is disposed in an external annular groove in the elastomeric suspension sleeve below the annular groove therein which receives the upper end of the upper part of the shell. With this construction, the vibration absorbing material is securely held in place to facilitate assembly of the parts of the shell with the other components of the installation.

The foregoing objects, advantages, features and results of the present invention, together with various other objects, advantages, features and results thereof which will be evident to those skilled in the art to which the invention relates in the light of this disclosure, may be achieved with the exemplary embodiment of the invention described in detail hereinafter and illustrated in the accompanying drawings, in which:

FIG. 1 is a perspective view of a kitchen waste disposal appliance or device which embodies the invention;

FIG. 2 is a view, partially in vertical section and partially in side elevation, taken along the arrowed line 2—2 of FIG. 1; and FIGS. 3, 4, 5 and 6 are enlarged, fragmentary sectional views respectively duplicating portions of FIG. 2.

Referring to the drawings, the numeral 10 designates generally a kitchen waste disposal appliance or device of the invention which is shown as suspended from a sink 12 of the type utilized in conjunction with a restaurant dish table, not shown. In such an installation, food waste is removed from the dishes, preliminary to washing the latter, on the dish table and is flushed downwardly through the sink into the waste disposal device 10, the sink being provided with a drain opening 14 for this purpose.

In general, the waste disposal appliance 10, as best shown in FIG. 2, includes a housing 16 having an open upper end 18 below the drain opening 14, tubular elastomeric suspension means 20 for suspending the housing 16 resiliently and pendulously from the sink 12 and for conducting water and waste downwardly into the housing, a rotatable comminuting or grinding means 22 at the lower end of the housing, motor means 24 below and operatively connected to the comminuting means for rotating same, vibration absorbing material 26 surrounding the housing 16, and an outer shell 28 enclosing the vibration absorbing material.

The suspension means 20 comprises an elastomeric sleeve 30 which acts in tension to support the housing 16, and the various components carried thereby, below the sink 12 and which largely prevents direct transmission of vibration from the housing to the sink. More particularly, the sleeve 30 is provided at its upper and lower ends with upper and lower, outwardly extending, peripheral flanges 32 and 34 respectively connected to the sink 12 around the drain opening 14 therein and the housing 16 around the open upper end 18 thereof. The upper flange 32 is disposed in an upper ring 36 of channel-shaped cross section which is horizontally split into upper and lower parts 38 and 40 of generally L-shaped cross section. The upper flange 32 is clamped between the upper and lower parts 38 and 40 of the upper ring 36 by bolts 42 extending therethrough. The elastomeric sleeve 30 is secured to the sink 12 by providing the latter with an outwardly extending, peripheral flange 44 which is clamped between the upper part 38 of the upper ring 36 and the upper flange 32 of the sleeve.

The lower flange 34 is disposed in a lower ring 46 of channel-shaped cross section which is also split horizontally into upper and lower parts 48 and 50 of generally L-shaped cross section. The lower flange 34 of the elastomeric sleeve 30 is clamped between the upper and lower parts 48 and 50 of the lower ring 46 by bolts 52 which extend through the lower flange. The lower part 50 of the lower ring 46 is provided with an inwardly facing, downwardly converging annular flange 54 on which is seated a complementary external annular shoulder 56 on the housing 16 adjacent the open upper end 18 thereof. The housing 16 is provided around the open upper end 18 thereof with projections which extend into the lower end of the elastomeric sleeve 30 to register the sleeve and the housing accurately.

The foregoing horizontally split, upper and lower rings 36 and 46 provide a simple and effective means of securing the elastomeric sleeve 30 to the sink 12 and the housing 16 to the elastomeric sleeve, such connections providing easy assembly of the parts mentioned, which is an important feature.

The elastomeric sleeve 30 is provided adjacent its upper end with a downwardly converging portion 58 which terminates at its lower end in a generally cylindrical portion 60 of substantial vertical length, such cylindrical portion being provided at its lower end with an outwardly extending peripheral flange 62. The downwardly converging portion 58 has a downwardly converging external wall 64 and the flange 62 has a downwardly diverging external wall 66, these walls being joined by circumferentially spaced, vertical external ribs 68 formed integrally with the portions 58 and 60 and the flange 62. The ribs 68 reinforce the cylindrical portion 60 and tend to stiffen same to cause it to resist any tendency of the device 10 to move laterally due to unbalanced loading, for example. Consequently, the cylindrical portion 60 may be of substantial length in the vertical direction to minimize vibration transmission from the housing 16 to the sink 12, which is an important feature.

The housing 16 is split horizontally into upper and lower parts 70 and 72 held together by bolts 74, and clamped between the two parts of the housing is a grinding ring 76 which forms part of the comminuting means 22. The grinding ring 76 cooperates with comminuting elements or hammers 78 pivotally mounted on a rotary table 80, waste comminuted by the comminuting means being discharged from the housing 16 through a laterally projecting tubular outlet 82 formed on the lower housing part 72. The rotary table 80 is mounted on a vertically oriented shaft 84 of the motor means 24, the latter preferably comprising an electric motor 86 having a housing 88 which is suitably secured to the lower part 72 of the housing 16, as by bolts 90. The motor housing 88 is shown as provided with an upwardly projecting annular skirt 92 telescoped over the lower end 94 of the lower part 72 of the housing 16 of the appliance 10.

The vibration absorbing material 26, which may be any material suitable for sound insulating purposes, has, in the particular construction illustrated, the form of a separate annular blanket 96 which encircles the housing 16 and which is provided with an opening 98 therethrough for the outlet 82. The upper end of the blanket 96 is tucked into an external annular groove 100 in the suspension means 20, such groove being formed by the flanges 34 and 62 on the elastomeric sleeve 30. Mounting the insulating blanket 96 in this manner facilitates subsequent assembly of the shell 28 with the other components of the appliance 10, which is an important feature.

The shell 28, which may be formed of metal, plastic, or the like, encloses and confines the vibration absorbing material 26. The shell 28 is vertically oriented and is horizontally split into upper and lower parts 102 and 104 in a plane containing the axis of the outlet 82. The lower end of the upper shell part 102 and the upper end of the lower shell part 104 are notched in alignment with the opening 98 in the blanket 96 to permit the outlet 82 to project therethrough. The resulting opening in the shell is ringed by an elastomeric annulus 106 which encircles the outlet 82 and which is provided with an external annular groove 108 receiving the edges of the notches in the shell parts 102 and 104. This prevents direct transmission of vibration from the outlet 82 to the shell parts.

The upper end of the upper shell part 102 is inserted into an external annular groove 110 in the elastomeric sleeve 30, specifically in the annular flange 62 thereon. As will be apparent, the upper end of the upper shell part 102 may readily be inserted into the groove 110 after the sound deadening blanket 96 has been installed.

The lower end of the lower shell part 104 is clamped between the skirt 92 on the motor housing 88 and an annular shoulder on the lower housing part 16 around the lower end 94 thereof. The lower end of the annular blanket 96 of sound absorbing material is seated against the housing 16 and the lower shell part 104 in this region.

The lower end of the upper shell part 102 and the upper end of the lower shell part 104 are secured together in spaced relationship by an elastomeric ring 112 which may be formed integrally with the elastomeric annulus 106, or as a separate piece. The elastomeric ring 112 is provided with upper and lower grooves 114 and 116 therein which receive the lower end of the upper shell part 102 and the upper end of the lower shell part 104, respectively, such ends of the shell parts respectively having outturned flanges 118 and 120 respectively disposed in the grooves 114 and 116 to securely lock the shell parts and the elastomeric ring together. As will be apparent, the upper end of the lower shell part 104 and the lower end of the upper shell part 102 may readily be slipped into the respective grooves therefor in the elastomeric ring 112 during assembly.

It will be apparent that, when the waste disposal appliance 10 is in operation, vibration transmission to the sink 12 is effectively minimized by the elastomeric sleeve 30, which, acting in tension to support the weight of the appliance, is a very poor vibration conductor. The sleeve 30 is also a very poor vibration transmitter when acting in bending or shear as the result of vibration of the appliance. Generally radial transmission of sound vibrations directly into the atmosphere from the housing 16 is minimized by multiple reflection within the vibration absorbing material 26, which completely surrounds the housing 16. Any sound vibrations which do pass through the vibration absorbing material 26 are largely reflected inwardly by making the shell 28 of a smooth-surfaced material, such as metal, plastic, or the like. Sound transmission directly to the upper shell part 102 in particular is minimized by elastomerically connecting the upper end of such shell part to the housing 16 through the elastomeric sleeve 30, and by elastomerically connecting the lower end of such shell part to the lower shell part 104 through the elastomeric ring 112. The overall effect of the elastomeric suspension means 20 and the vibration absorbing material 26 is to greatly reduce the noise level in the vicinity of the appliance 10 by internal attenuation.

Although an exemplary embodiment has been disclosed herein for purposes of illustration, it will be understood that various changes, modifications, and substitutions may be incorporated in such embodiment without departing from the spirit of the invention as defined by the claims which follow.

We claim:

1. In a kitchen waste disposal device, the combination of:
   (a) a vertically oriented structure including a housing having an open upper end for the introduction of waste and carrying adjacent its lower end rotatable comminuting means for comminuting such waste, and including motor means below and connected to said comminuting means for rotating same;
   (b) means for resiliently and pendulously suspending said structure from a sink having a drain opening therein with said open upper end of said housing below and in communication with the drain opening, comprising a vertically oriented elastomeric sleeve connected at its lower end to said housing around said open upper end thereof and adapted to be connected at its upper end to the sink around the drain opening therein;
   (c) vibration absorbing material encircling at least said housing;
   (d) a vertically oriented, horizontally split shell enclosing said vibration absorbing material, the upper part of said shell being spaced from said structure throughout its entire area;
   (e) means connecting the upper end of the upper part of said shell to said sleeve;
   (f) means connecting the lower end of the lower part of said shell to said structure; and
   (g) an elastomeric ring provided therein with two spaced annular grooves one having therein the lower end of the upper part of said shell and the other having therein the upper end of the lower part of said shell, said grooves being separated by the elastomeric material of said ring, whereby said ring elastomerically separates said upper and lower parts of said shell from each other to minimize vibration transmission from one to the other.

2. A waste disposal device as set forth in claim 1 wherein:
   (a) said housing is provided with a horizontally outwardly projecting outlet which extends outwardly through said vibration absorbing material, said lower and upper ends, respectively, of said upper and lower parts of said shell, and said ring; and
   (b) said ring having an integral annulus which encircles said outlet and the elastomeric material of which elastomerically separates said upper and lower parts of said shell from said outlet to minimize vibration transmission therebetween.

References Cited in the file of this patent

UNITED STATES PATENTS

| | | |
|---|---|---|
| 1,748,039 | Kennedy | Feb. 18, 1930 |
| 2,629,558 | Miller | Feb. 24, 1953 |
| 2,743,875 | Brezosky et al. | May 1, 1956 |
| 2,851,224 | Jordan | Sept. 9, 1958 |
| 2,894,698 | Brucken | July 14, 1959 |
| 2,896,866 | Hyde | July 28, 1959 |
| 2,939,639 | Coss | June 7, 1960 |
| 2,949,246 | Hyde | Aug. 16, 1960 |
| 2,951,650 | Gould | Sept. 6, 1960 |
| 2,965,318 | Jordan | Dec. 20, 1960 |

FOREIGN PATENTS

| | | |
|---|---|---|
| 23,442 | Australia | Apr. 10, 1930 |